United States Patent [19]

Ueyanagi et al.

[11] 4,388,245

[45] Jun. 14, 1983

[54] PROCESS FOR PREPARING ORGANIC POLYISOCYANATE COMPOSITIONS

[75] Inventors: Kaoru Ueyanagi; Akira Ide, both of Nobeoka; Masaaki Kato, Fuji; Kazuro Komatsu, Hyuga, all of Japan

[73] Assignee: Asahi Kasei Kogyo Kabushiki Kaisha, Japan

[21] Appl. No.: 293,174

[22] Filed: Aug. 17, 1981

[30] Foreign Application Priority Data

Aug. 28, 1980 [JP] Japan ................................ 55-117803

[51] Int. Cl.³ ................ C07C 127/24; C07C 119/042
[52] U.S. Cl. .......................... 260/453 AB; 260/239 A; 544/222; 560/24; 560/115; 560/159
[58] Field of Search .................... 260/453 AB, 239 A; 544/222; 560/24, 115, 159

[56] References Cited

U.S. PATENT DOCUMENTS 3,903,126  9/1975  Woerner et al. ............. 260/453 AB
3,903,127  9/1975  Wagner et al. ............. 260/453 AB
4,152,350  5/1979  Möhring et al. ............. 260/453 AB

*Primary Examiner*—Dolph H. Torrence
*Attorney, Agent, or Firm*—Finnegan, Henderson, Farabow, Garrett & Dunner

[57] ABSTRACT

A process for preparing a modified aliphatic, alicyclic or araliphatic organic polyisocyanate composition which comprises heating an aliphatic, alicyclic or araliphatic organic polyisocyanate composition having at least two isocyanate groups in one molecule at a temperature of from about 100° C. to about 200° C. in the presence of an aliphatic, alicyclic or araliphatic organic diisocyanate monomer in an amount of at least about ½ of the weight of the organic polyisocyanate composition and removing unreacted aliphatic, alicyclic or araliphatic organic diisocyanate monomer.

26 Claims, 1 Drawing Figure

PROCESS FOR PREPARING ORGANIC POLYISOCYANATE COMPOSITIONS

BACKGROUND OF THE INVENTION

1. Field of the Invention

This invention relates to a process for preparing an organic polyisocyanate composition. The organic polyisocyanate composition herein means a prepolymer formed from at least two molecules of an aliphatic, alicyclic or araliphatic organic diisocyanate monomer. The prepolymer is generally an oligomer such as a dimer, a trimer, a tetramer and a pentamer or a mixture thereof. An araliphatic organic diisocyanate monomer means an isocyanate compound comprising an aromatic group and an aliphatic group where isocyanate groups are bonded to the aliphatic group.

2. Description of the Prior Art

A polyisocyanate composition having, on an average, at least two isocyanate groups in one molecule which have reactivity with active hydrogen-containing compounds, is widely used as a starting material for preparing polyurethanes in various fields such as foam materials, coating materials, adhesives, etc. by utilization of this property. Particularly, when this composition is used as the isocyanate component in a two component type polyurethane coating material, there can be obtained a coated film having excellent coating properties such as abrasion resistance, adhesion, chemical resistance, solvent resistance, flexibility, electrical insulation, etc. Such a coating material is highly evaluated as one of the most excellent coating materials.

However, the polyisocyanate composition is required to have various characteristic features depending on the field of uses and regions for applications. For example, in some cases it is desired that quick dryability is imparted to a formulation containing the polyisocyanate composition, while other properties such as elasticity, strength, hardness and weatherability of the polyurethane obtained must be improved in other cases. Thus, disadvantageously such requirements cannot be satisfied with one to several kinds of polyisocyanates. Accordingly, it is a general practice to blend several kinds of polyisocyanate compositions in order to obtain desirable characteristic features. But there is required a high level of technique and experience for designing an appropriate formulation of compositions and it is also very cumbersome to get all of these polyisocyanate compositions ready. Thus, the above described problem has not been fundamentally solved.

Generally speaking, as a suitable isocyanate component to be used as a hardener for polyurethane coating materials, foam materials and adhesives, diisocyanate monomers as such cannot be used due to their toxicity and stimulation since they have a relatively higher vapor pressure and accordingly, they are modified into polymers of the diisocyanate monomers, i.e., polyisocyanate compositions to remove the toxicity and stimulation before use.

On the other hand, in various fields including the field of coating materials, there is a strong demand for a high solids formulation such as coating materials of high solids content where the amount of a thinner is reduced to a minimum from the viewpoint of environmental safety, energy-saving for drying and cost-saving of the thinner. But the viscosity of the above described polyisocyanate compositions which can be used as a hardener for polyurethane coating materials is generally very high and some polyisocyanate compositions are solid at normal temperature. For convenience in usage, such highly viscous or solid polyisocyanates compositions can only be used by being diluted with a solvent such as ethyl acetate, butyl acetate, cellosolve acetate, toluene, xylene, etc. This high viscosity of the polyisocyanate compositions is a great obstacle to the preparation of a high solids formulation of polyurethane coating materials. Thus, in this field it is fully expected to provide polyisocyanate compositions having a low viscosity in which the non-volatiles content is even 100%, hence requiring no thinner in the preparation of coating materials, and also not having toxicity and irritant odor.

U.S. Pat. No. 3,903,127 describes the preparation of polyisocyanates with a biuret structure suitable as an isocyanate component for high solids content urethane coating materials by reacting a diisocyanate with a biuretizing agent in proportions corresponding to a mol ratio of the diisocyanate to the biuretizing agent of at least 11:1. Particularly as biuret polyisocyanates obtained from hexamethylene diisocyanate as the starting material, there are disclosed polyisocyanate compositions having a comparatively low viscosity of about 700 to about 800 centipoise [hereinafter "cP"] at 25° C.

In order to obtain a hexamethylene diisocyanate biuret polyisocyanate composition having a low viscosity of about 800 cP at 25° C., however, it is necessary to control the mol ratio of hexamethylene diisocyanate to the biuretizing agent to an extremely great ratio of 30:1 to 50:1, and a markedly large amount of unreacted monomer must be removed and recovered before the polyisocyanate composition formed is separated. This results in an increase in the commercial production cost of a single species of polyisocyanate composition. Furthermore, it is disadvantageous to commercially produce a number of various polyisocyanate compositions corresponding to various properties such as the viscosity and the dryability of compositions containing the polyisocyanate compositions required in various fields of use and application as well as corresponding to the final polyurethane products.

As the result of extensive investigations directed to very easily and economically preparing an organic polyisocyanate composition which is further decreased in viscosity and/or improved in compliance to various requirements with respect to the properties such as the dryability of a composition containing the organic polyisocyanate composition as well as the properties of final polyurethane products, it has now been found that an aliphatic, alicyclic or araliphatic organic polyisocyanate composition can be decreased in its viscosity and/or can be modified by heating at a specified temperature in the presence of a specified amount of an aliphatic, alicyclic or araliphatic organic diisocyanate monomer.

SUMMARY OF THE INVENTION

Accordingly, the present invention provides a process for preparing a modified aliphatic, alicylic or araliphatic organic polyisocyanate composition which comprises heating an aliphatic, alicyclic or araliphatic organic polyisocyanate composition having at least two isocyanate groups in one molecule at a temperature of from about 100° C. to about 200° C. in the presence of an aliphatic, alicyclic or araliphatic organic diisocyanate monomer in an amount of at least ½ of the weight of the organic polyisocyanate composition and removing unreacted aliphatic, alicyclic or araliphatic organic diisocyanate.

BRIEF DESCRIPTION OF THE DRAWINGS

FIGURE shows a gel permeation chromatogram of the polyisocyanate composition in Example 15 given by a solid line and a gel permeation chromatogram of Polyisocyanate [A] given by a dotted line.

DETAILED DESCRIPTION OF THE INVENTION

Figure 1:
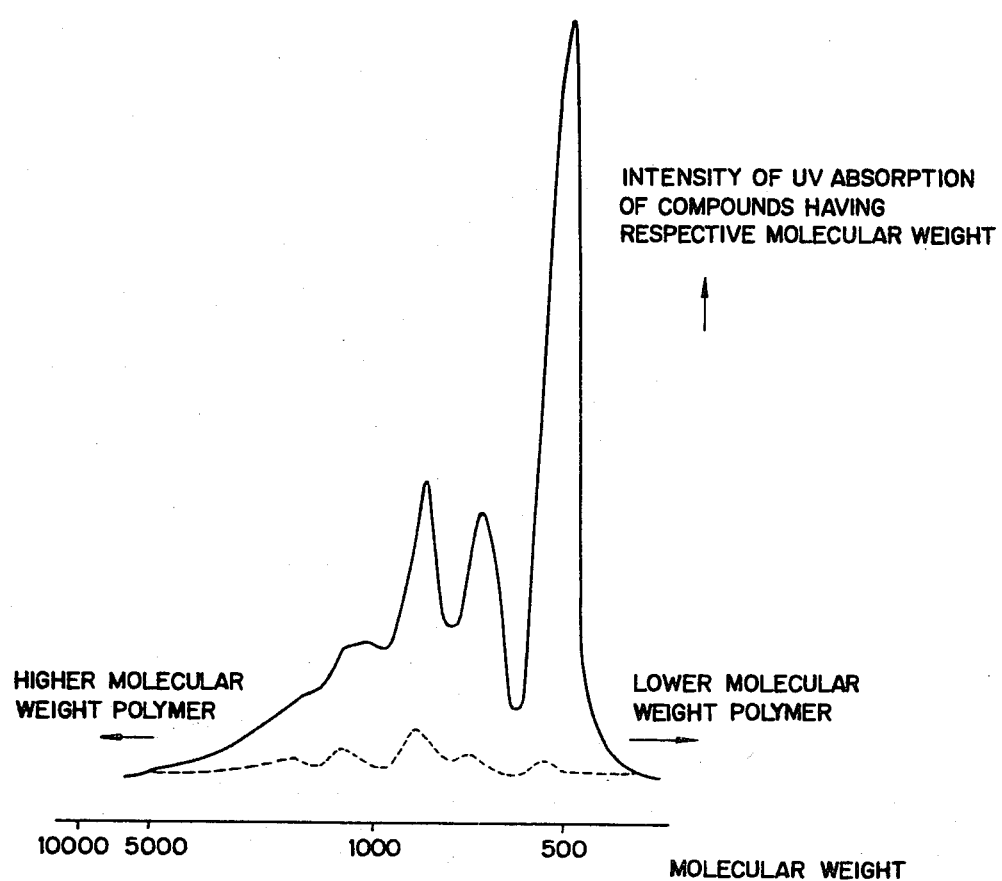

According to the process of this invention, there can be obtained polyisocyanate compositions having an extremely low viscosity of 250 cP at 25° C. without any solvent for dilution and at the same time containing substantially no free monomer in case of hexamethylene diisocyanate biuret polyisocyanates. Such low viscosity polyisocyanate compositions are not known in the art and not only can greatly contribute to the preparation of high solids content polyurethane coating materials but also can be very useful as an isocyanate component for the preparation of non-yellowing urethane foams requiring non-solvent, low diisocyanate monomer content and low viscosity as well as for the preparation of non-yellowing urethane adhesives.

The present invention not only provides a process for preparing remarkably low viscosity polyisocyanate compositions but also provides a commercially advantageous process which can easily modify polyisocyanate compositions once formed to polyisocyanate compositions having desired characteristic features by heating in the presence of an organic diisocyanate monomer. Thus, if one kind of polyisocyanate composition is prepared in a large amount, then it is possible to easily obtain a polyisocyanate composition having a variety of desired characteristic features by treatment of the polyisocyanate composition according to the process of this invention.

A distinguishing characteristic feature of this invention resides in heating a polyisocyanate composition in the presence of an organic diisocyanate monomer and subsequently removing excess organic diisocyanate monomer. In the field of the art it has generally been accepted that heating of a polyisocyanate composition will result in an increase in the viscosity due to the increased molecular weight of the polyisocyanate composition heated. In fact, when a polyisocyanate composition is heated in the absence of an organic diisocyanate monomer, for example, when a polyisocyanate composition containing substantially no free organic diisocyanate monomer as such is heated or when a polyisocyanate composition is diluted with a conventional solvent inert to isocyanate groups and then heated, the viscosity of the polyisocyanate composition heated is inevitably increased and the polyisocyanate composition finally becomes a resinous high molecular weight polymer insoluble in conventional organic solvents.

Whereas, it has now been found that when a polyisocyanate composition is heated in the presence of a certain species of organic diisocyanate monomer, the viscosity of the polyisocyanate composition recovered after the heating is decreased. Furthermore, during the heating, substantially no evolution of gases such as carbon dioxide is observed, as neither biuretization nor carbodiimide formation of the isocyanate component occurs. As a result of analyzing the polyisocyanate composition recovered, it has been found that the organic diisocyanate monomer used in the heating is incorporated in the high molecular weight polyisocyanates as a constituent of their molecule in the polyisocyanate composition and that the amount of the high molecular weight polyisocyanates is described in some cases. Thus it may be assumed that during the heating in the presence of an organic diisocyanate monomer, cleavage of a high molecular weight polyisocyanate in the polyisocyanate composition and/or incorporation of the organic diisocyanate monomer present into respective molecules of the polyisocyanate composition seems to occur.

Accordingly, by appropriately selecting a certain polyisocyanate composition as a basis and an organic diisocyanate monomer present during the heating in accordance with purposes, it is possible to very easily and conveniently modify the polyisocyanate composition to prepare a polyisocyanate composition which can provide compositions containing the polyisocyanate composition and having desired properties, and also final polyurethanes having desired properties. Such an easy modification method of polyisocyanate compositions is not known and its advantage of commercial applications is immense.

For example, there is a strong demand for high solids content type coating materials in the field of two component type polyurethane coating materials, and polyisocyanate curing agents having a low viscosity are wanted as described earlier. Whereas, a hexamethylene diisocyanate biuret polyisocyanate composition which is generally employed as a non-yellowing type polyisocyanate has a viscosity of several thousand to ten thousand cP without a solvent at normal temperature and is required to be diluted with a solvent. However, if such a polyisocyanate is heated in the presence of hexamethylene diisocyanate monomer according to the process of this invention, it is possible to decrease its viscosity to an extremely low viscosity of about 250 cP at normal temperature in a state substantially free from the hexamethylene diisocyanate monomer. Furthermore, an isophorone diisocyanate biuret polyisocyanate composition which is a complete solid at normal temperature and must be dissolved in a solvent for use as a coating material can be rendered liquid and fluid by heating together with hexamethylene diisocyanate monomer. Such a decrease in the viscosity of polyisocyanate compositions not only contributes to the preparation of high solids content polyurethane coating materials but also it is significant in that the polyisocyanate compositions can be more widely applied in the field of foams and adhesives.

Further, it is pointed out that the dryability of a two component type polyurethane coating material where a hexamethylene diisocyanate type curing agent having best coating properties among conventional polyurethane coating materials is employed is inferior to that of a polyurethane coating material where an aromatic type curing agent is employed. Also, the process of the present invention is effective for overcoming such a drawback. For example, when a hexamethylene diisocyanate biuret polyisocyanate composition is heated in the presence of an organic diisocyanate monomer suitable for the improvement of dryability such as an araliphatic organic diisocyanate monomer and an alicyclic organic diisocyanate monomer, the dryability of the coating material can be improved without imparting the good coating properties inherent in the hexamethylene diisocyanate type.

On the other hand, polyurethane coating materials using a polyisocyanate composition formed from an araliphatic organic diisocyanate monomer possess a defect in the coating properties and are considerably inferior in the weatherability to those using a polyisocyanate composition formed from an aliphatic or alicyclic organic diisocyanate monomer. In order to overcome this drawback, when the above described araliphatic organic polyisocyanate composition is subjected to a heat treatment in the presence of an aliphatic or alicyclic organic diisocyanate monomer, the aliphatic or alicyclic organic diisocyanate monomer is incorporated as a constituent in each molecule of the araliphatic organic polyisocyanate composition and as a result, the weaterability of the coating material can be remarkably improved.

Furthermore, polyurethanes are generally formed by the reaction between a polyol and a polyisocyanate composition and the physical properties of the polyurethanes such as flexibility, elasticity, rigidity, hardness and strength are greatly influenced by the isocyanate component as well as by the polyol component. For example, a polyurethane obtained by using an alicyclic organic polyisocyanate composition formed from, for example, isophorone diisocyanate and cyclohexane diisocyanate is generally hard while a polyurethane obtained by using an aliphatic organic polyisocyanate composition formed form, for example, hexamethylene diisocyanate and trimethylhexamethylene diisocyanate is flexible. These polyurethanes, however, are applied in various fields where various physical properties are required. Thus, the performances and characteristic features required for polyisocyanate compositions are varied. In compliance with these requirements it is necessary to prepare various kinds of polyisocyanate compositions possessing a variety of performances and characteristic features. According to the process of this invention, however, a variety of polyisocyanate compositions which can impart a variety of physical properties required such as flexibility and rigidity to final polyurethane products can be easily prepared by selecting a certain polyisocyanate composition as a basis and appropriately selecting an organic diisocyanate monomer present in the heating to modify the polyisocyanate composition.

The aliphatic, alicyclic or araliphatic organic polyisocyanate compositions having at least two isocyanate group in one molecule which can be modified as a starting material in this invention include polyisocyanates with a biuret structure (hereinafter "biuret polyisocyanates"), isocyanurate polyisocyanates or urethodione polyisocyanates formed from aliphatic, alicyclic or araliphatic organic diisocyanate monomer as exemplified below; and urethane polyisocyanates which are reaction products between aliphatic, alicyclic or araliphatic organic diisocyanate monomers as exemplified below and polyhydric alcohols.

The biuret polyisocyanates can be obtained by reacting the organic diisocyanate monomers with biuretizing agents. Exemplary biuretizing agents include water; compounds containing water as adduct such as, especially, salts containing water of crystallization including $Na_2SO_4.10H_2O$; organic compounds which split off water such as organic dicarboxylic acids which tend to form anhydrides such as maleic acid and phthalic acid; tertiary alcohols such as tert-butanol and tert-amyl alcohol; formic acid, primary aliphatic amines preferably having at most 5 carbon atoms such as methylamine, ethylamine, butylamine and allylamine; N,N'-disubstituted ureas such as N,N'-dimethylurea, N,N'-diethylurea, N-methyl-N'-cyclohexylurea, N-ethyl-N'-butylurea and N,N'-di-n-propylurea; and urea. The mol ratio of the organic diisocyanate monomer to the biuretizing agent which can be employed is preferably at least 3:1, and in this reaction there may be used a solvent inert to the isocyanate groups such as ethyl acetate, butyl acetate, cellosolve acetate, cellosolve methyl acetate, methyl ethyl ketone, methyl isobutyl ketone, dioxane, benzene, toluene, xylene, monochlorobenzene, o-dichlorobenzene, trimethyl phosphate and triethyl phosphate, and a catalyst such as a tertiary amine compound and a metal compound of tin, lead or zinc. The reaction temperature is typically about 40° C. to about 220° C. and preferably about 80° C. to about 180° C. The desired biuret polyisocyanate can be obtained by removing and recovering unreacted organic diisocyanate monomer and the solvent from the reaction mixture by an appropriate means such as reduced pressure distillation using a thin layer evaporator or extraction with a solvent. The biuret polyisocanate thus obtained is generally a viscous liquid having a viscosity at 25° C. at least about 800 cP or a solid and the NCO content is generally about 10 to about 40% by weight [see Japanese Patent Publication No. 16448/1962 and Japanese Patent Application (OPI) No. 134629/1974].

The isocyanurate polyisocyanates can be prepared by the reaction of the organic diisocyanate monomers in the presence of a so-called trimerization catalyst for organic polyisocyanates. Suitable examples of such catalysts include tertiary amines such as a dialkylaminoalkylphenol including 2,4,6-tris(dimethylamino)phenol, triethylamine, an N,N'-N"-tris(-diaminoalkyl)hexahydrotriazine, a tetraalkylalkylene diamine, diazabicyclooctane and its lower alkyl substituted compounds; tertiary alkylphosphines such as tributylphosphine; alkali methal salts of an imide such as potassium phthalimide; onium compounds such as quaternary onium hydroxy compounds of nitrogen, phosphorus, arsenic or antimony and onium hydroxy compound of sulfur or selenium; alkyl substituted ethyleneimines such as N-methylethyleneimine and phenyl-N,N-ethyleneurea; metal salts of a carboxylic acid such as potassium acetate, 2-ethylhexanoic acid lead salt, sodium benzoate and potassium naphthenate; oxides, hydroxides or carbonates of an alkali metal or an alkaline earth metal and metal salts of an enol compound or phenol; epoxy compounds; organotin compounds such as tributyltin acetate and bis(tributyltin)oxide; organometal compounds such titanium tetrabutyrate and tributylantimony oxide; Friedel-Crafts catalysts such as aluminum chloride, boron trifluoride; chelate compounds of an alkali metal such as salicylaldehyde sodium; $\beta$-diketone metal chelate compounds such as aluminum acetylacetone and lithium acetylacetone. The amount of the catalyst employed typically ranges from about 0.05 to about 10% by weight based on the weight of the organic diisocyanate monomer. In addition to the catalyst there may be used a promoter such as an aliphatic alcohol, a phenol, a secondary amine and an imidazole in an amount of typically about 0.05 to about 10% by weight based on the weight of the organic diisocyanate monomer. The same solvents as employed in the preparation of biuret polyisocyanates may also be used. The reaction temperature employed typically ranges from about 10° C. to about 200° C. When the organic diisocyanate monomer in the reaction mixture is reduced from 90 to 10% by weight of its feed amount, the reaction is stopped by the addition of a theoretical amount or slight excess of an inorganic acid such as anhydrous hydrogen chloride, sulfuric acid and phosphoric acid to deactivate and insolubilize the catalyst, and then the catalyst is separated by filtration. From the reaction mixture thus obtained there can be obtained an isocyanurate polyisocyanate in the same manner as described above. The isocyanurate polyisocyanate thus obtained is generally a viscous liquid having a viscosity at 25° C. of at least about 800 cP or a solid and the NCO content is generally about 10 to 40% by weight.

The urethodione polyisocyanates can be obtained by the reaction of the organic diisocyanate monomers in the presence of a catalyst in the presence or absence of a solvent inert to the isocyanate groups at a temperature of from about 0° C. to about 120° C., preferably from about 0° C. to about 60° C. Suitable examples of such catalysts include tertiary alkylphosphines having at least one aliphatic substituent such as triethylphosphine, tributylphosphine and phenyldimethylphosphine. The amount of the catalyst employed is about 0.1 to about 5% by weight based on the weight of the organic diisocyanate monomer. When the organic diisocyanate monomer in the reaction mixture is reduced to 90 to 10% by weight of its feed amount, the reaction is stopped by an appropriate method, for example, by the addition of sulfur to deactivate and insolubilize the catalyst, and then the catalyst is separated by filtration. From the reaction mixture thus obtained, unreacted organic diisocyanate monomer and the solvent are removed and recovered in the same manner as described above to give a urethodione polyisocyanate. The urethodione polyisocyanate thus obtained is a viscous liquid having a viscosity at 25° C. of, in general, at least about 500 cP or a solid and the NCO content is generally about 10 to about 40% by weight.

The urethane polyisocyanates can be prepared by reacting the organic diisocyanate monomers with polyhydric alcohols. Exemplary polyhydric alcohols include alkylene diols such as ethylene glycol, 1,3- and 1,2-propanediols, 1,4-, 1,3- and 2,3-butanediols, 1,5-pentanediol, 2,2-dimethyl-1,3-propanediol, 1,6-hexanediol, 2-methyl-1,3-propanediol, 2-methyl-2-propyl-1,3-propanediol and 2-methyl-2-phenyl-1,3-propanediol; triols such as trimethylolpropane, trimethylolethane, glycerin, 1,2,6-hexanetriol and tris-2-hydroxyethyl isocyanurate; polyhydric alcohols having an ether bond such as diethylene glycol, triethylene glycol, dipropylene glycol, tripropylene glycol, polyethylene glycol, polypropylene glycol and polytetramethylene glycol; tetra-or more-than-tetra-hydric alcohols such as pentaerythritol and sugar including D-fructose, glucose and sucrose; terminally hydroxylated polybutadienes and hydrogenated polybutadienes; di- or more-than-di-hydric alcohols having an ester group such as neopentyl glycol-2-hydroxy pivalate and polyester polyols; acryl polyols. These alcohols may be used singly or in combination with one another. In the reaction a solvent inert to the isocyanate groups may be used and a catalyst such as a tertiary amine and an organotin compound for promoting urethanation may also be used. The reaction temperature employed ranges from about 0° C. to about 200° C., preferably from about 40° C. to about 160° C. and the NCO/OH mol ratio employed is at least 2/1. When the reaction is completed, unreacted organic diisocyanate monomer and the solvent are removed and recovered from the reaction mixture to give a urethane polyisocyanate. The urethane polyisocyanate thus obtained is generally a viscous liquid having a viscosity at 25° C. of at least about 800 cP or a solid and the NCO content is generally about 10 to about 40% by weight. From the viewpoint of the strong demand for non-yellowing polyurethanes, polyisocyanate compositions formed from aliphatic or alicyclic organic diisocyanate monomers are preferred. Exemplary aliphatic or alicyclic organic polyisocyanate compositions include hexamethylene diisocyanate biuret polyisocyanates, isophorone diisocyanate biuret polyisocyanates, hexamethylene diisocyanate-trimethylolpropane adduct polyisocyanates and isophorone diisocyanate-trimethylolpropane adduct polyisocyanates. If necessary or if desired, the organic polyisocyanate compositions may contain a solvent, an auxiliary such as a catalyst or an additive such as a light stabilizer. Exemplary solvents include ethyl acetate, butyl acetate, toluene, xylene, methyl cellosolve acetate and trimethyl phosphate. Exemplary catalysts include tertiary amines and organotin compounds and exemplary light stabilizers include benzophenones, benzotriazoles and cyanoacrylate compounds. The amount of the solvent employed is preferably at most equivalent to the organic diisocyanate monomer employed and the amount of the catalyst or the light stabilizer employed is preferably about 1 ppm to about 5% by weight based on the weight of the organic polyisocyanate composition.

The aliphatic, alicyclic or araliphatic organic diisocyanate monomers can be employed in heating the aliphatic, alicyclic or araliphatic organic polyisocyanate composition in this invention are appropriately selected in accordance with the purpose of the modification of the organic polyisocyanate composition. Exemplary aliphatic organic diisocyanate monomers include tetramethylene diisocyanate, pentamethylene diisocyanate, hexamethylene diisocyanate, 2,2,4-trimethylhexamethylene diisocyanate, heptane-1,7-diisocyanate, octane-1,8-diisocyanate, nonane-1,9-diisocyanate, decane-1,10-diisocyanate, dodecane-1,12-diisocyanate and lysine diisocyanate. Exemplary alicyclic organic diisocyanate monomers include isophorone diisocyanate, hydrogenated xylylene diisocyanate, hydrogenated diphenylmethane diisocyanate, cyclohexylene-1,4-diisocyanate, cyclohexylene-1,2-diisocyanate, 1,2-di(isocyanatomethyl)-cyclobutane, 1-methyl-2,6-diisocyanatocyclohexane and 1-methyl-2,4-diisocyanatocyclohexane. Exemplary araliphatic organic diisocyanate monomers include m-xylylene diisocyanate, p-xylylene diisocyanate and bis-(isocyanatomethylphenyl)methanes. These organic diisocyanate monomers may be used singly or in combination with one another. Of these organic diisocyanate monomers, hexamethylnene diisocyanate is especially preferred for the purpose of decreasing the viscosity of the organic polyisocyanate compositions. If necessary or if desired, the aliphatic, alicyclic or araliphatic organic diisocyanate monomers may contain a solvent, an auxiliary or an additive as described above.

The amount of the aliphatic, alicyclic or araliphatic organic diisocyanate monomer which can be employed in this invention is at least about ½ of the weight of the aliphatic, alicyclic or araliphatic organic polyisocyanate composition. A preferred weight ratio of the organic polyisocyanate composition to the organic diisocyanate monomer is about 1:30 to about 2:1 and a more preferred weight ratio of the organic polyisocyanate composition to the organic diisocyanate monomer is about 1:20 to about 1:1. When this weight ratio is greater than 2:1, noticeable improvement effect on the modification of the organic polyisocyanate composition cannot be observed. On the other hand, when the weight ratio is lower than about 1:30, the amount of the organic diisocyanate monomer which is recovered in the separation of the modified organic polyisocyanate composition after the heating is disadvantageously increased from the economical viewpoint. Particularly for the purpose of decreasing the viscosity of the organic polyisocyanate composition using hexamethylene diisocyanate, an appropriate weight ratio of the organic polyisocyanate composition to hexamethylene diisocyanate is about 1:30 to about 1:2.

The heating temperature which can be employed in this invention typically ranges from about 100° C. to about 200° C. and preferably from about 120° C. to about 180° C. When the heating temperature is lower than about 100° C., there can be obtained only poor effect on the modification of the organic polyisocyanate composition. On the other hand, when the heating temperature is higher than about 200° C., the organic polyisocyanate composition tends to suffer remarkable discoloration, and accordingly cannot be employed for practical purposes, at the same time by-products such as carbodiimide are unfavorably formed in a relatively large amount.

The heating time which can be employed at a temperature of the above-specified range is typically about 5 minutes to aboug 3 hours. If the heating time is too short, the effect on the modification of the organic polyisocyanate composition is poor. On the other hand, if the heating time is too long, a lot of heat energy is uneconomically required.

The modified organic polyisocyanate composition obtained according to the process of this invention may be separated from unreacted organic diisocyanate monomer by a suitable method such as distillation under reduced pressure using, for example, a thin layer evaporator, and extraction with a solvent. In performing this procedure, unreacted organic diisocyanate monomer should be substantially completely removed. It is preferred that the amount of unreacted organic diisocyanate monomer remaining in the modified organic polyisocyanate be not higher than about 0.7% by weight. If the amount of unreacted organic diisocyanate monomer is great, problems of toxicity and stimulation due to the organic diisocyanate monomer present are undesirably offered.

Thus, the organic polyisocyanate composition can be modified in accordance with purposes by varing such factors as the kind of the organic diisocyanate monomer added at the time of heating, the weight ratio of the organic polyisocyanate composition to the organic diisocyanate monomer chosen, the heating temperature and heating time selected.

For example, when an organic polyisocyanate composition such as a hexamethylene diisocyanate biuret polyisocyanate is treated with an aliphatic organic diisocyanate monomer such as hexamethylene diisocyanate, there can be obtained a modified organic polyisocyanate composition having an especially low viscosity. When an organic polyisocyanate composition such as an isophorone diisocyanate-trimethylolpropane adduct polyisocyanate is treated with an aliphatic organic diisocyanate monomer, there can be obtained a modified organic polyisocyanate composition having a considerably decreased viscosity and, in addition, the flexibility of the polyurethane obtained by using the modified organic polyisocyanate composition can be improved. Furthermore, when an organic polyisocyanate composition such as a hexamethylene diisocyanate biuret polyisocyanate is treated with an araliphatic organic diisocyanate monomer such as a xylylene diisocyanate or with an alicyclic organic diisocyanate monomer such as isophorone diisocyanate, the dryability of the composition containing the modified organic polyisocyanate composition can be markedly improved.

In view of the fact that these improvements have been the tasks in this field which are expected to be accomplished, the present invention should be highly evaluated for providing an answer to these tasks by means of a very simple process.

This invention is further illustrated in more detail by ways of the following examples, but they are given for illustrative purposes only and are not to be construed as limiting the invention. Unless otherwise indicated, all parts and percents are by weight.

EXAMPLE 1

1680 Parts of hexamethylene diisocyanate were reacted with 18 parts of water in 300 parts of methyl cellosolve acetate as the solvent at 160° C. for one hour, and then unreacted hexamethylene diisocyanate and the solvent were removed from the reaction mixture and recovered using a thin layer evaporator at a temperature of about 160° C. and at a pressure of about 0.2 mmHg to give a hexamethylene diisocyanate biuret polyisocyanate as a ground sediment. The viscosity of this product (hereinafter referred to "Polyisocyanate [A]") was 1700 cP at 25° C., the NCO content 23.2% and the free hexamethylene diisocyanate content 0.2%.

A mixture of 100 parts of Polyisocyanate [A] and 400 parts of hexamethylene diisocyanate was heated under stirring at 160° C. in a nitrogen atmosphere for one hour. During the heating no substantial evolution of gases such as $CO_2$ was observed. From the reaction mixture, excess hexamethylene diisocyanate was removed using a thin layer evaporator in the same manner as described above to give 120 parts of a polyisocyanate. The viscosity of the polyisocyanate obtained was reduced to 1100 cP at 25° C., the NCO content was 23.4% and the residual hexamethylene diisocyanate content was 0.2%.

EXAMPLE 2

A mixture of 100 parts of Polyisocyanate [A] and 900 parts of hexamethylene diisocyanate was heated under the same conditions as described in the latter part of Example 1, followed by purification using a thin layer evaporator in the same manner as described in Example 1 to give 130 parts of a polyisocyanate. The polyisocyanate obtained had a viscosity of 640 cP at 25° C., a NCO content of 23.8% and a residual hexamethylene diisocyanate content of 0.3%. The results of analysis of the molecular distribution in Polyisocyanate [A] and the polyisocyanate obtained in this Example by gel permeation chromatography using a device (HLC-830, manufactured by Shimadzu Seisakusho Ltd.) are shown in Table 1.

TABLE 1

| | GPC Peak Area Ratio (%) (Detector: Differential Refractometer) | |
|---|---|---|
| | Polyisocyanate [A] | Polyisocyanate of Example 2 |
| Dimer | 10 | 18 |

TABLE 1-continued

| | GPC Peak Area Ratio (%) (Detector: Differential Refractometer) | |
|---|---|---|
| | Polyisocyanate [A] | Polyisocyanate of Example 2 |
| Trimer | 52 | 50 |
| Tetramer + Pentamer | 17 | 18 |
| Oligomers higher than pentamer | 21 | 14 |

As clearly seen from Table 1, the polyisocyanate of this Example is reduced in the high molecular weight products higher than the pentamer with an increase in the dimer, as compared with the starting material Polyisocyanate [A].

EXAMPLE 3

Example 2 was repeated except that the amount of Polyisocyanate [A] was changed to 50 parts. As the result, there were obtained 72 parts of a polyisocyanate having a viscosity of 250 cP at 25° C., a NCO content of 24.2% and a residual hexamethylene diisocyanate content of 0.2%.

EXAMPLE 4

Example 2 was repeated except that the heating temperature and time were changed to 120° C. and 2 hours, respectively, to obtain 115 parts of a polyisocyanate having a viscosity of 1200 cP at 25° C., a NCO content of 23.5% and a residual hexamethylene diisocyanate content of 0.3%.

EXAMPLE 5

Example 2 was repeated except that the heating temperature and time were changed to 180° C. and 30 minutes, respectively, to obtain 140 parts of a polyisocyanate having a viscosity of 610 cP at 25° C., a NCO content of 24.2% and a residual hexamethylene diisocyanate content of 0.3%.

EXAMPLE 6

The same procedure as described in the latter part of Example 1 was repeated except that the heating temperature and time were changed to 180° C. and one hour, respectively, to obtain 120 parts of a polyisocyanate having a viscosity of 1300 cP at 25° C., a NCO content of 23.8% and a residual hexamethylene diisocyanate content of 0.2%.

EXAMPLE 7

A mixture of 90 parts of Polyisocyanate [A], 400 parts of hexamethylene diisocyanate and 200 parts of methyl cellosolve acetate was heated at 160° C. for one hour, followed by purification using a thin layer evaporator in the same manner as in Example 1 to give a polyisocyanate having a viscosity of 1100 cP at 25° C.

EXAMPLE 8

Example 7 was repeated except that 200 parts of trimethyl phosphate were used instead of 200 parts of methyl cellosolve acetate, to obtain a polyisocyanate having a viscosity of 1200 cP at 25° C.

EXAMPLE 9

1008 Parts of hexamethylene diisocyanate were reacted with 18 parts of water in a mixed solvent of 250 parts of methyl cellosolve acetate and 250 parts of trimethyl phosphate at 160° C. for one hour, followed by purification using a thin layer evaporator in the same manner as in Example 1 to give a hexamethylene diisocyanate biuret polyisocyanate (hereinafter referred to "Polyisocyanate [B]") having a viscosity of 4400 cP at 25° C., a NCO content of 22.8% and a residual hexamethylene diisocyanate content of 0.4%. A mixture of 150 parts of Polyisocyanate [B] and 850 parts of hexamethylene diisocyanate was heated at 140° C. for one hour, followed by purification using a thin layer evaporator in the same manner as in Example 1 to give 190 parts of a polyisocyanate. This polyisocyanate had a viscosity of 1600 cP at 25° C., a NCO content of 23.1% and a residual hexamethylene diisocyanate content of 0.3%.

EXAMPLE 10

2520 Parts of hexamethylene diisocyanate were reacted with 18 parts of water at 160° C. in 500 parts of methyl cellosolve acetate as the solvent for one hour, and the reaction product was purified using a thin layer evaporator in the same manner as in Example 1. The hexamethylene diisocyanate biuret polyisocyanate thus obtained had a viscosity of 1000 cP at 25° C., a NCO content of 24.2% and a residual hexamethylene diisocyanate content of 0.3%. A mixture of 150 parts of this polyisocyanate with 850 parts of hexamethylene diisocyanate was heated at 160° C. for one hour and then the product was purified using a thin layer evaporator in the same manner as in Example 1 to give 195 parts of polyisocyanate having a viscosity of 320 cP at 25° C., a NCO content of 24.3% and a residual hexamethylene diisocyanate content of 0.2%.

In the above described Examples 1 to 10 the heating of hexamethylene diisocyanate biuret polyisocyanate in the presence of hexamethylene diisocyanate monomer was described in detail and in each Example there was obtained a polyisocyanate whose viscosity was lower than that of the starting polyisocyanate by heating in the presence of hexamethylene diisocyanate. Particularly as could be seen from Example 3, by suitably selecting the conditions there could be obtained a product having such a low viscosity as had never been accomplished with hexamethylene diisocyanate biuret polyisocyanates.

EXAMPLE 11

1008 Parts of hexamethylene diisocyanate were reacted with 134 parts of trimethylolpropane at 120° C. for 2 hours in the absence of a solvent, and then unreacted hexamethylene diisocyanate was removed from the reaction mixture and recovered using a thin layer evaporator in the same manner as in Example 1. The hexamethylene diisocyanate-trimethylolpropane adduct polyisocyanate thus obtained was a very viscous liquid and diluted with ethyl acetate to such an extent that the amount of non-volatiles was 75%. This diluted polyisocyanate had a viscosity of 300 cP at 25° C., a NCO content of 12.4% and a residual hexamethylene diisocyanate content of 0.5%.

A mixture of 200 parts of the undiluted hexamethylene diisocyanate-trimethylolpropane adduct polyisocyanate and 800 parts of hexamethylene diisocyanate was heated at 160° C. for one hour, followed by recovery of excess hexamethylene diisocyanate using a thin layer evaporator in the same manner as in Example 1. The polyisocyanate obtained was diluted with ethyl acetate to such an extent that the amount of non-volatiles was 75%. The viscosity of this diluted polyisocyanate was found to be reduced to 150 cP at 25° C.

EXAMPLE 12

1776 Parts of isophorone diisocyanate were reacted with 18 parts of water at 160° C. in 360 parts of methyl cellosolve acetate as the solvent for 1.5 hours, and unreacted isophorone diisocyanate and the solvent were removed from the reaction mixture and recovered using a thin layer evaporator in the same manner as in Example 1. The isophorone diisocyanate biuret polyisocyanate obtained (hereinafter referred to "Polyisocyanate [C]") was solid at 25° C. Polyisocyanate [C] was diluted with ethyl acetate to such an extent that the amount of involatiles was 75% and the viscosity of this diluted polyisocyanate was 4000 cP at 25° C. and the NCO content was 12.2%.

200 Parts of Polyisocyanate [C] were dissolved in 800 parts of hexamethylene diisocyanate and heated at 140° C. for one hour, followed by recovery of excess hexamethylene diisocyanate using a thin layer evaporator in the same manner as in Example 1. The polyisocyanate obtained was modified into a liquid having fluidity at 25° C. and the viscosity of the polyisocyanate was 5900 cP at 25° C. without dilution with a solvent and the viscosity was 130 cP at 25° C. when the polyisocyanate was diluted with ethyl acetate to such an extent that the amount of non-volatiles was 75%.

Two coating materials were prepared by mixing, as the component A, the Polyisocyanate [C] or the polyisocyanate of this Example with, as the component B, an acrylic polyol having 50% of non-volatiles and a hydroxyl value of solids of 100 (trademark "Acrydic A-801", manufactured by Dainippon Ink & Chemicals, Inc.) at a NCO/OH mol ratio of 1/1 and diluting the mixture with a mixed solvent of toluene/butyl acetate/ethyl acetate/xylene/cellosolve acetate in a 30/30/20/15/5 weight ratio to such an extent that the solids content was adjusted to 15 seconds at 25° C. by Ford cup #4 in accordance with the method JIS K 5402.

The coating material thus obtained was coated on a mild steel sheet and a tinplate sheet, respectively, in such a manner that the thickness of the coated film was 50μ with an air spray gun having a nozzle diameter of 10 mm (Type W-61, manufactured by Iwata Painting Machine Industry Co., Ltd.) and the coated film was hardened at 20° C. at a relative humidity of 65±5% for 7 days. The properties of the coated films were measured and the results are shown in Table 2.

TABLE 2

| Properties of Coated Film | Polyisocyanate of Example 12 | Polyisocyanate [C] |
|---|---|---|
| External Appearance | Good | Good |
| Gloss | | |
| Du Pont Impact Strength*1 (cm) (500 g × ½ inch) | 40 | <10 |
| Bending*2 | 5 mm φ passed | 10 mm φ not passed |
| Erichsen*3 (mm) | 8 passed | at most 0.1 |
| Adhesion (to Iron)*4 | 100/100 | 0/100 |

Notes:
*1 JIS K 5400
*2 JIS K 5400
*3 JIS Z 2247
*4 JIS D 0202

As seen from Table 2 the coating material employing the polyisocyanate of this Example gave a coated film having remarkably improved reflexibility together with good external appearance and gloss, compared with that employing Polyisocyanate [C].

EXAMPLE 13

2220 Parts of isophorone diisocyanate were reacted with 134 parts of trimethylolpropane in the absence of a solvent at 120° C. for 2 hours, and then unreacted isophorone diisocyanate was recovered by extraction with n-hexane to give a trimethylolpropane adduct polyisocyanate. When this product was diluted with ethyl acetate as the solvent to such an extent that the amount of non-volatiles was adjusted to 75%, the viscosity of this diluted polyisocyanate was 3000 cP at 25° C. 200 Parts of the undiluted polyisocyanate were dissolved in 800 parts of hexamethylene diisocyanate and heated at 160° C. for one hour, followed by recovery of a polyisocyanate using a thin layer evaporator in the same manner as in Example 1. When the polyisocyanate obtained was diluted with ethyl acetate to such an extent that the amount of non-volatiles was adjusted to 75%, the viscosity of the diluted polyisocyanate was reduced to 880 cP.

A coating material was prepared in the same manner as in Example 12 except that the polyisocyanate as obtained above was employed as the component A, and then a coated film was obtained from the coating material in the same manner as in Example 12. As the result, the flexibility of the coated film was improved to the same extent as that of Example 12.

EXAMPLE 14

3330 Parts of isophorone diisocyanate were reacted with 18 parts of water in a mixed solvent containing 830 parts of trimethyl phosphate and 830 parts of methyl cellosolve acetate at 160° C. for 1.5 hours, and then unreacted isophorone diisocyanate was removed from the reaction mixture and recovered using a thin layer evaporator in the same manner as in Example 1. The isophorone diisocyanate biuret polyisocyanate thus obtained had a viscosity of 1500 cP at 25° C., when the polyisocyanate was diluted with ethyl acetate to such an extent that the amount of non-volatiles was adjusted to 75%. 150 Parts of this polyisocyanate were dissolved in 850 parts of isophorone diisocyanate monomer and heated at 160° C. for one hour, followed by recovery of excess isophorone diisocyanate monomer using a thin layer evaporator in the same manner as in Example 1. The viscosity of the polyisocyanate obtained was reduced to 970 cP, when the polyisocyanate was diluted with ethyl acetate to such an extent that the amount of non-volatiles was adjusted to 75%.

EXAMPLE 15

200 Parts of Polyisocyanate [A] as used in Example 1 were mixed with 800 parts of xylylene diisocyanate and heated at 140° C. for one hour. The polyisocyanate obtained by removal of excess xylylene diisocyanate from the reaction mixture had a viscosity of 3100 cP at 25° C. The accompanying Figure shows gel permeation chromatograms of the above obtained polyisocyanate given by a solid line and Polyisocyanate [A] given by a dotted line, obtained by using the same gel permeation chromatography device as in Example 2 using a UV detector manufactured by Shimadzu Seisakusho Ltd. In the measurement the sample concentration and the detection sensitivity were severely controlled to be the same.

As apparently seen from Figure, the Polyisocyanate [A] as the starting material which is aliphatic, hardly exhibits recognizable UV absorptions over the entire molecular weight region to be differentiated by the gel permeation chromatography. On the other hand, in the gel permeation chromatogram for the polyisocyanate obtained in Example 15, there are exhibited strong UV absorptions over the entire molecular weight region, indicating that xylylene diisocyanate was incorporated with the higher molecular weight products as a constituent of their molecule in the polyisocyanate.

The polyisocyanate thus obtained can impart a high dryability to coating materials. For example, when this polyisocyanate was formulated into a coating material using the same Acrydic A-801 as in Example 12 at a NCO/OH mol ratio of 1/1, the dry through time for obtaining a coated film using the polyisocyanate of this Example was shortened to 17 to 20 hours, while that using Polyisocyanate [A] was as long as 37 to 39 hours. The dry through time herein mentioned refers to a period of time until no gauze mark remains on a coated film when a gauze is placed on the coated film and a flat bottomed weight of 100 g is weighed thereon for one minute at a temperature of 20° C. and at a relative humidity of 65±5%.

EXAMPLE 16

150 Parts of Polyisocyanate [A] were mixed with 850 parts of isophorone diisocyanate and heated at 180° C. for one hour, followed by removal of excess isophorone diisocyanate using a thin layer evaporator in the same manner as in Example 1. The viscosity of the polyisocyanate thus obtained increased to 3900 cP at 25° C., but the dry through time of the coating material using this product was shortened to 20 to 22 hours, as compared with 37 to 39 hours in the case of that using Polyisocyanate [A] when the dry through time was measured in the same manner as in Example 15.

EXAMPLE 17

2820 Parts of xylylene diisocyanate were reacted with 18 parts of water in 600 parts of methyl cellosolve acetate as the solvent at 160° C. for one hour, and unreacted xylylene diisocyanate was removed from the reaction mixture and recovered using a thin layer evaporator in the same manner as in Example 1. The xylylene diisocyanate biuret polyisocyanate thus obtained (hereinafter referred to "Polyisocyanate [D]") had a viscosity of 39000 cP and a NCO content of 22.9%.

200 Parts of Polyisocyanate [D] were dissolved in 800 parts of hexamethylene diisocyanate and heated at 160° C. for one hour and then excess hexamethylene diisocyanate was recovered using a thin layer evaporator in the same manner as in Example 1. The viscosity of the polyisocyanate thus obtained was reduced to 10000 cP at 25° C.

Two coating materials and coated films therefrom were prepared in the same manner as in Example 12 using the polyisocyanate as obtained above and Polyisocyanate [D] as the component A, respectively. The weather-o-meter yellowing degree of the coated films was measured according to the method of JIS K 7103 by a weather-o-meter (WELSUN-DCA, manufactured Shikenki Co., Ltd.). The results are shown in Table 3.

TABLE 3

| Polyisocyanate | Δ Yellowness Index (500 hours) |
|---|---|
| Polyisocyanate of Example 16 | 5.2 |
| Polyisocyanate [D] | 11.0 |

It can been understood that the polyisocyanate of this Example is greatly improved in weatherability as compared with Polyisocyanate [D].

It should further be noted that there was observed no substantial evolution of gases such as $CO_2$ in Examples 2 to 16, as mentioned in Example 1.

All the polyisocyanates as obtained in Examples 1 to 16 have a very good solubility in thinners and a very good compatibility with polyols as the base resin for coating materials and are, therefore, very useful not only as a hardener for coating materials but also have a wide range of applications in various fields such as foam materials and adhesives.

COMPARATIVE EXAMPLES 1 TO 7

A mixture of 100 parts of Polyisocyanate [A] as used in Example 1 and 900 parts of an organic solvent as set forth in Table 4 below was heated at 160° C. for one hour, followed by recovery of the solvent using a thin layer evaporator in the same manner as in Example 1. The polyisocyanate thus obtained had a viscosity as shown in Table 4.

TABLE 4

| Comparative Example | Solvent | Viscosity of Polyisocyanate Recovered (cP at 25° C.) |
|---|---|---|
| 1 | None | 7800 |
| 2 | N—Methylpyrrolidone | >10000 |
| 3 | Triethylene glycol dimethyl ether | " |
| 4 | Dimethylacetamide | " |
| 5 | Trimethyl phosphate | Insolubles were formed in the heated solution |
| 6 | o-Dichlorobenzene | Insolubles were formed in the heated solution |
| 7 | Diethylene glycol diacetate | Insolubles were formed in the heated solution |

As clearly seen from Table 4, when the polyisocyanate was diluted with a solvent other than diisocyanate monomers and then heated, the polyisocyanate recovered after the heating was converted to a highly viscous product and furthermore, formation of precipitates during the heating could been seen in Comparative Examples 5 to 7. Moreover, the polyisocyanates prepared in Comparative Examples 1 to 4 were remarkably inferior in the solubility in a thinner for coating materials and in compatibility with acrylic polyols as the base resin for coating materials, as compared with Polyisocyanate [A], whereby they could not be used as hardeners for coating materials.

Table 5 below shows the molecular weight distribution of the polyisocyanates obtained in Comparative Examples 1 to 3 measured by the gel permeation chromatography in the same manner as in Example 2.

TABLE 5

| | GPC Peak Area Ratio (%) (Detector: Differential Refractometer) | | | |
|---|---|---|---|---|
| | Polyisocyanate [A] | Polyisocyanate of Comparative Example 1 | Polyisocyanate of Comparative Example 2 | Polyisocyanate of Comparative Example 3 |
| Dimer | 10 | 3 | 6 | 3 |
| Trimer | 52 | 36 | 14 | 20 |
| Tetramer + Pentamer | 17 | 15 | 15 | 18 |
| Oligomers higher than pentamer | 21 | 46 | 65 | 59 |

As clearly understood by the comparison of Table 5 with Table 1, when no diisocyanate is present, there can be observed no decrease in the high molecular weight products as mentioned in Example 2 and in contrast with this there can be observed the phenomenon of increasing the high molecular weight products.

Analysis of the data of Examples and Comparative Examples clearly shows that the effect of the present invention can only be achieved by heating a polyisocyanate in the presence of a diisocyanate monomer. This fact is surprising enough and interesting as it is, and moreover, the polyisocyanate obtained according to the present invention is very useful. Further, it is possible to easily prepare a polyisocyanate which can give desired properties of a composition containing the polyisocyanate as well as desired final properties of polyurethanes. These are noticeable commercial advantages of the present invention.

While the invention has been described in detail and with reference to specific embodiments thereof, it will be apparent to one skilled in the art that various changes and modifications can be made therein without departing from the spirit and scope thereof.

What is claimed is:

1. A process for preparing an aliphatic, alicyclic or araliphatic organic polyisocyanate composition which comprises heating an aliphatic, alicyclic or araliphatic organic polyisocyanate composition having at least two isocyanate groups in one molecule at a temperature of from about 100° C. to about 200° C. in the presence of an aliphatic, alicyclic or araliphatic organic diisocyanate monomer in an amount of at least about ½ of the weight of the organic polyisocyanate composition and removing unreacted aliphatic, alicyclic or araliphatic organic diisocyanate monomer.

2. The process of claim 1, wherein the heating temperature is from about 120° C. to about 180° C.

3. The process of claim 1, wherein the heating is conducted for about 5 minutes to about 3 hours.

4. The process of claim 1, wherein the heating of the organic polyisocyanate composition in the presence of the organic diisocyanate monomer is conducted in the presence of a solvent.

5. The process of claim 1, wherein the weight ratio of the organic polyisocyanate composition to the organic diisocyanate monomer is about 1:30 to about 2:1.

6. The process of claim 5, wherein the weight ratio of the organic polyisocyanate composition to the organic diisocyanate monomer is about 1:20 to about 1:1.

7. The process of claim 1, wherein the organic polyisocyanate composition is a polyisocyanate composition with a biuret structure.

8. The process of claim 7, wherein the organic polyisocyanate composition is a polyisocyanate composition with a biuret structure and the organic diisocyanate monomer is an aliphatic organic diisocyanate monomer.

9. The process of claim 8, wherein the polyisocyanate composition with a biuret structure is an aliphatic diisocyanate biuret polyisocyanate and the organic diisocyanate monomer is an aliphatic organic diisocyanate monomer.

10. The process of claim 9, wherein the alphatic diisocyanate biuret polyisocyanate is a hexamethylene diisocyanate biuret polyisocyanate and the aliphatic organic diisocyanate monomer is hexamethylene diisocyanate.

11. The process of claim 7, wherein the organic polyisocyanate composition is a polyisocyanate composition with a biuret structure and the organic diisocyanate monomer is an alicyclic organic diisocyanate monomer.

12. The process of claim 11, wherein the polyisocyanate composition with a biuret structure is an aliphatic diisocyanate biuret polyisocyanate and the organic diisocyanate monomer is an alicyclic organic diisocyanate monomer.

13. The process of claim 12, wherein the aliphatic diisocyanate biuret polyisocyanate is a hexamethylene diisocyanate biuret polyisocyanate and the alicyclic organic diisocyanate monomer is isophorone diisocyanate.

14. The process of claim 7, wherein the organic polyisocyanate composition is a polyisocyanate composition with a biuret structure and the organic diisocyanate monomer is an araliphatic organic diisocyanate monomer.

15. The process of claim 14, wherein the polyisocyanate composition with a biuret structure is an aliphatic diisocyanate biuret polyisocyanate and the organic diisocyanate monomer is an araliphatic organic diisocyanate monomer.

16. The process of claim 15, wherein the aliphatic isocyanate biuret polyisocyanate is a hexamethylene diisocyanate biuret polyisocyanate and the araliphatic organic diisocyanate monomer is a xylylene diisocyanate.

17. The process of claim 7, wherein the polyisocyanate composition with a biuret structure is an alicyclic diisocyanate biuret polyisocyanate and the organic diisocyanate monomer is an alicyclic organic diisocyanate monomer.

18. The process of claim 17, wherein the alicyclic diisocyanate biuret polyisocyanate is an isophorone diisocyanate biuret polyisocyanate and the alicyclic organic diisocyanate monomer is isophorone diisocyanate.

19. The process of claim 7, wherein the polyisocyanate composition with a biuret structure is an alicyclic diisocyanate biuret polyisocyanate and the organic diisocyanate monomer is an aliphatic organic diisocyanate monomer.

20. The process of claim 19, wherein the alicyclic diisocyanate biuret polyisocyanate is an isophorone diisocyanate biuret polyisocyanate and the aliphatic organic diisocyanate monomer is hexamethylene diisocyanate.

21. The process of claim 7, wherein the polyisocyanate composition with a biuret polyisocyanate is an araliphatic diisocyanate biuret polyisocyanate and the organic diisocyanate monomer is an aliphatic organic diisocyanate monomer.

22. The process of claim 21, wherein the araliphatic diisocyanate biuret polyisocyanate is a xylylene diisocyanate biuret polyisocyanate and the aliphatic organic diisocyanate monomer is hexamethylene diisocyanate.

23. The process of claim 1, wherein the organic polyisocyanate composition is a urethane polyisocyanate and the organic diisocyanate monomer is an aliphatic organic diisocyanate monomer.

24. The process of claim 23, wherein the urethane polyisocyanate is a hexamethylene diisocyanate-trimethylolpropane adduct polyisocyanate and the aliphatic organic diisocyanate monomer is hexamethylene diisocyanate.

25. The process of claim 23, wherein the urethane polyisocyanate is an isophorone diisocyanate-trimethylolpropane adduct polyisocyanate and the aliphatic organic diisocyanate monomer is hexamethylene diisocyanate.

26. A process for reducing the viscosity of an aliphatic, alicyclic or araliphatic organic polyisocyanate composition comprising:

heating at a temperature of from about 100° C. to about 200° C. an aliphatic, alicyclic or araliphatic organic polyisocyanate composition having at least two isocyanate groups in one molecule in the presence of an aliphatic, alicyclic or araliphatic organic diisocyanate monomer in an amount of at least about ½ of the weight of the organic polyisocyanate composition;

removing unreacted aliphatic, alicyclic or araliphatic organic diisocyanate monomer; and recovering the modified aliphatic, alicyclic or araliphatic organic polyisocyanate composition.

* * * * *